(12) United States Patent
Casella et al.

(10) Patent No.: US 6,289,586 B1
(45) Date of Patent: Sep. 18, 2001

(54) MANUFACTURING OF HALF-CROWNED GEAR DRIVES FOR MOTION QUALITY IMPROVEMENT

(75) Inventors: James M. Casella; Robert E. Hildebrand, both of Webster; Anthony G. Poletto, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/528,376

(22) Filed: Mar. 17, 2000

(51) Int. Cl.[7] .................................................. B21D 53/28
(52) U.S. Cl. .......................... 29/893.1; 29/893; 29/893.3; 74/462; 264/328.1
(58) Field of Search ..................................... 29/893, 893.1, 29/893.2, 893.3; 74/462; 264/328.1

(56) References Cited

U.S. PATENT DOCUMENTS

| 5,151,278 | 9/1992 | Baxi et al. ............................ 425/130 |
| 5,639,405 | 6/1997 | Erikson ................................. 264/40.3 |
| 5,707,659 | 1/1998 | Erikson ................................. 425/130 |
| 5,802,921 | * 9/1998 | Rouverol ................................ 74/462 |

* cited by examiner

Primary Examiner—P. W. Echols

(57) ABSTRACT

Manufacturing a drive system with a mating gear set with substantially reduced gear axis misalignment drive motion non-uniformity error with half-crowned gear teeth, crowned on only one side, to allow for simple and low cost gear molding, but with the mating gears mounted to oppositely mesh their respectively half-crowned sides. The amount of crowning may be in the range of approximately 75–100 microns.

7 Claims, 5 Drawing Sheets

MANUFACTURING OF HALF-CROWNED GEAR DRIVES FOR MOTION QUALITY IMPROVEMENT

This application is related to U.S. Pat. No. 6,253,047, issued Jun. 26, 2001.

Disclosed in the embodiment herein is a low cost system and method of manufacturing and assembly of an improved gear drive system providing improved motion quality. It is particularly suitable for producing a lower cost, less critical, drive system for motion uniformity critical components, such as imaging surface drives in print engines, such as a xerographic photoreceptor drive system, although not limited thereto.

In particular, there is disclosed in the embodiment herein a crowned gear set drive system which can be manufactured a low cost by common plastic molding and reverse mounting engagement of half-crowned gears, allowing for simplified, lower cost, gear molding, yet providing the improved motion uniformity of fully crowned gears to compensate for misalignment of the mating gear axes. That is, the disclosed system can overcome or greatly reduce prior motion error problems in driven components caused by normal gear axis alignment errors between the respective axes of rotation of the mating gears. Such gear axes alignment errors occur normally from manufacturing and/or assembly tolerances and errors.

By thus reducing the criticality of the required degree of parallelism of the respective axes of rotation of the gears in a gear train, lower cost gear sets can be used to achieve the same acceptably high degree of motion smoothness in the output of the drive system. The motion quality improvement provided by the disclosed drive system may even enable the elimination in certain applications of typical "gear boxes" having rigid enclosing gear mounting box steel plate frames to hold all the gear shafts rotatably mounted therein with fully parallel axes of rotation.

As noted, uniform drive motion is particularly critical for the movement of the photoreceptor or other imaging surface of a printer. Even very small fluctuations in the motion of an imaging surface relative to an imager can create highly visible defects in the resultant prints. Numerous prior patents have addressed corrections in such motion fluctuation image quality problems. For example, Xerox Corp. U.S. Pat. No. 5,153,644 issued Oct. 6, 1992 to Eugene L. Yang, et al, and various other references on this subject cited therein. Also noted are Xerox Corporation U.S. Pat. Nos. 5,937,241 and 5,845,175 on gear mounts for enhanced motion quality.

The increasing demand for high resolution color printers, with their superposed plural images of different colors, and their requirements for large uniform color solid image areas, has added to printer motion control criticality. Such printers are especially prone to customer observable image defects in print quality, including those due to motion errors.

Printer drive system noise, especially for printers in office environments, is also an issue of concern to printer manufacturers. Furthermore, it is increasingly subject to various governments regulations.

The prior difficulty and cost of manufacturing gears with a precise desired amount of gear tooth crowning, instead of straight teeth edges, has been a limiting factor in their utilization. The system of the disclosed embodiment is particularly applicable to relatively low cost but accurately molded plastic gears. It will be apparent to those skilled in the art that the same basic method may also be applicable to compressed powdered metal gears.

Examples of precision plastic gear molding art, especially with gas injection molding for enhanced conformity, are disclosed in co-pending Xerox Corp. U.S. provisional application No. 60/156,220 filed Sep. 27, 1999, entitled "Plastic Injection Molding with Reduced Dimensional Variations Using Gas Pressure and Secondary Plastic Injection," by Robert E. Hildebrand, Attorney Docket No. D/99507P, and art cited therein, including U.S. Pat. Nos. 5,707,659; 5,639,405; and 5,151,278.)

Since, in the oppositely half-crowned gear set drive disclosed herein, crowning of only one lead edge of one side of each gear tooth need be provided to achieve the desired results, relatively little mold and/or tooling changes in manufacturing are required as compared to normal gear molding. In particular, with only single side crowning of the gear teeth, as disclosed herein, a simple two-part mold with a simple draw can be used to make the gear, and mold parting line flashing in the tooth engagement surface can be avoided, thus providing a significant cost advantage in producing low cost crowned gears suitable for the substantially improved motion uniformity drive systems.

Various types of different gear crowning for different purposes, and manufacturing methods, are known in other arts, and need not be described herein. For example, it is known in the automobile industry to provide gear tooth crowning at magnitudes of 0 to 10 microns to control audio noise in gear meshes of automobiles. Crowning of 6–12 microns is typically standard.

There are also articles available such as: "Method for Cutting Straight Bevel Gears Using Quasi-Complementary Crown Gears", by Koreaki Ichino, Hisashi Tamura and Kazumasa Kawasaki, available on the Internet at "http://www.gear-net.com" as Report 5 on the Japan Gear-Net website, pages 1–13 (initial publication date unknown). It discloses hobbing metal gear teeth to provide crowning.

A specific feature of the specific embodiments disclosed herein is to provide a method of manufacturing an improved gear drive system to provide improved drive motion uniformity with reduced manufacturing costs, said method producing a gear drive system comprising at least one pair of rotatable first and second engaged gears with respectively engaged gear teeth areas and respective first and second gear axes, said gear drive system having a drive motion tolerance to slight alignment variations of said first and second gear axes relative to one another; comprising: molding said first and second drive gears with gear teeth having outer edge crowning on only one side of said gear teeth in a mold in which the parting lines of said mold are outside of said respectively engaged gear teeth areas, said gear tooth outer edge crowning being sufficient to substantially increase said drive motion uniformity of said drive system with said alignment variations of said first and second axes of gear rotation; and assembling said first and second gears engaged into said gear drive system so that said outer edge crowning on only one side of said gear teeth of said engaged first and second gears are respectively opposite in position to one another to provide said tolerance in motion control to slight alignment variations of said first and second gear axes relative to one another.

Further specific features disclosed in the embodiments herein, individually or in combination, include said first and second gears are oppositely half-crowned plastic molded gears; and/or wherein said gear tooth outer edge crowning of said engaged gear teeth of said first and second gears is an equal but opposite lead circular half-crowning; and/or wherein said first and second gears are identically molded in the same mold but assembled inverted relative to one another in said gear drive system to provide said oppositely positioned outer edge crowning; and/or wherein said gear teeth have outer edges which are substantially linear other than at said crowned outer edge thereof.

As to specific components of the subject apparatus, or methods of manufacture, or alternatives therefor, it will be appreciated that, as is normally the case, some such components and methods are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be re-described herein.

Various of the above-mentioned and further features and advantages will be apparent to those skilled in the art from the specific method and apparatus described in the example below, and the claims. Thus, the present invention will be better understood from this description of the following specific embodiment, including the drawing figures (which are approximately to scale) wherein:

Figure 3:
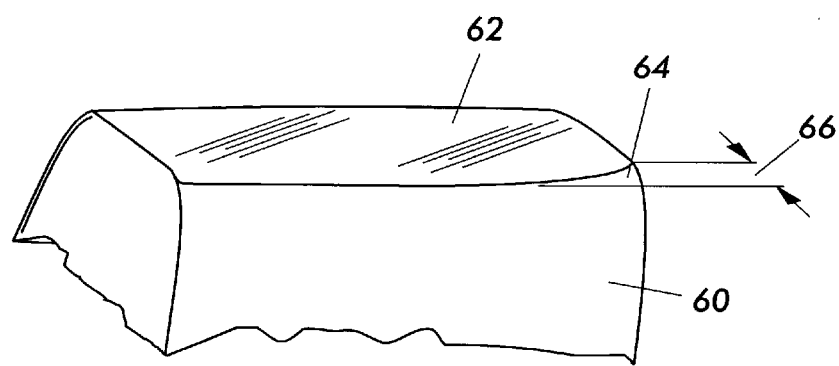
FIG. 3 is an enlarged perspective view of the outer end of a single gear tooth showing an example of the subject gear tooth half-crowning, with the space between the facing arrows showing the amount of such crowning, at only one side of the gear tooth, which is exaggerated here for illustrative clarity.
Figure 4:
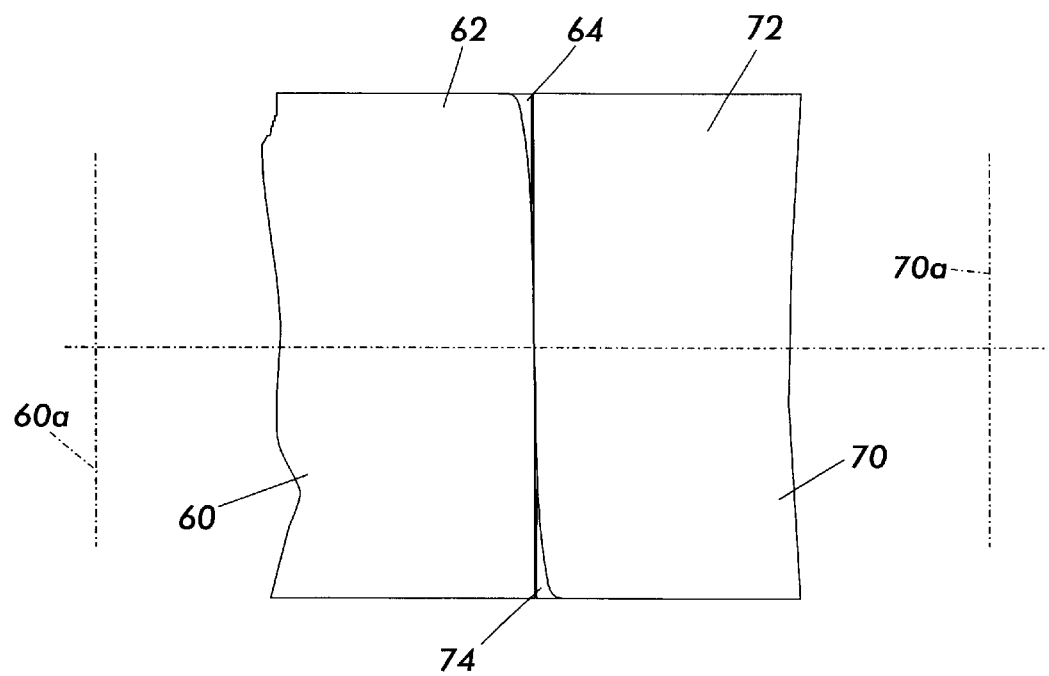
FIG. 4 is a partial top view of the half-crowned gear tooth of FIG. 3 and a mating half-crowned gear tooth which is oppositely positioned, on its opposite tooth side, in a partial top view, taken along the line "4–6" of FIG. 2 as described above, with parallel (not misaligned) gear axes.
Figure 5:
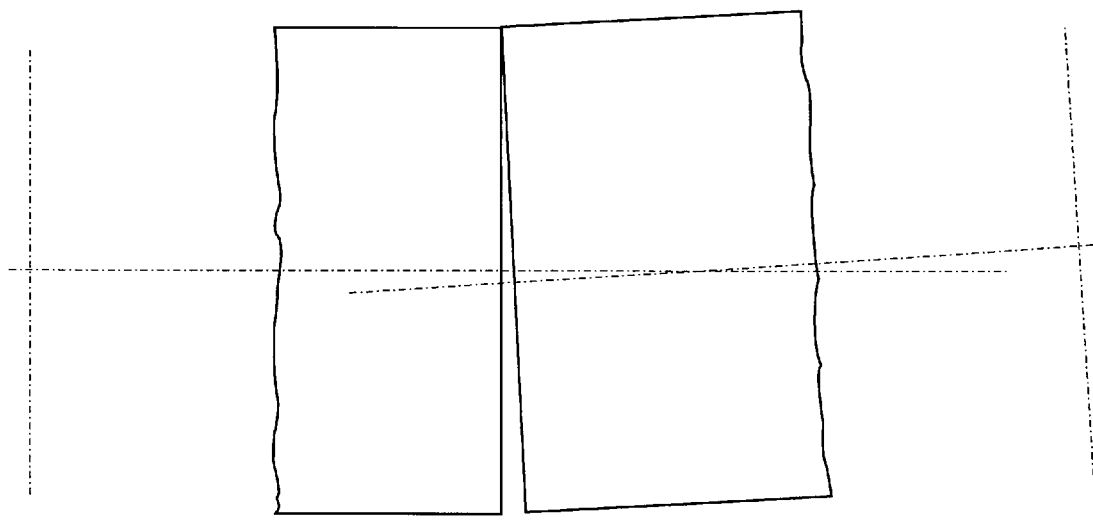
Figure 6:
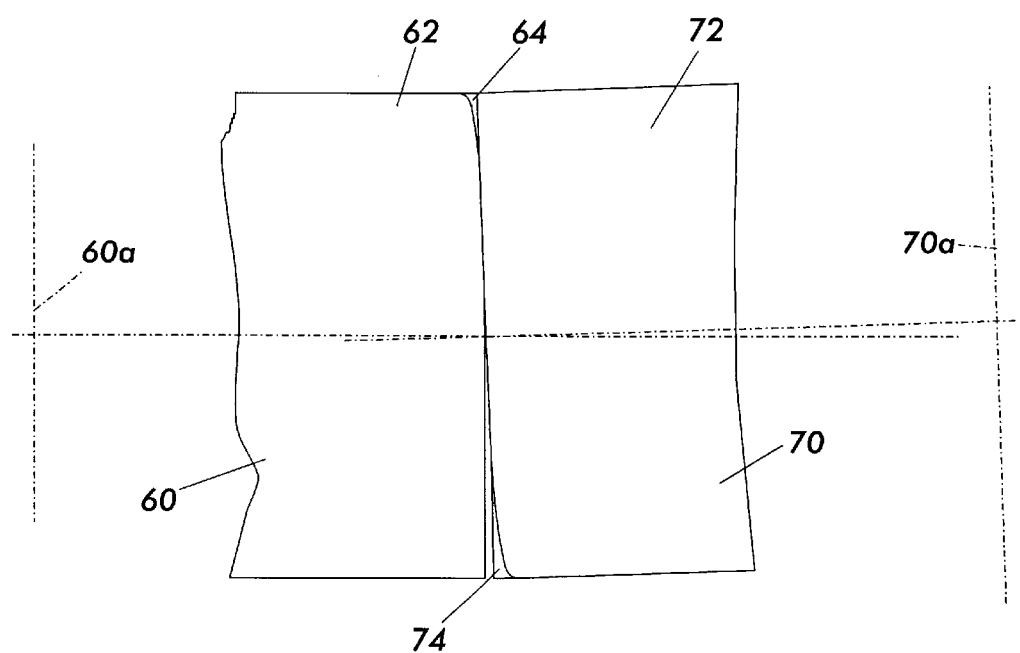
Figure 7:
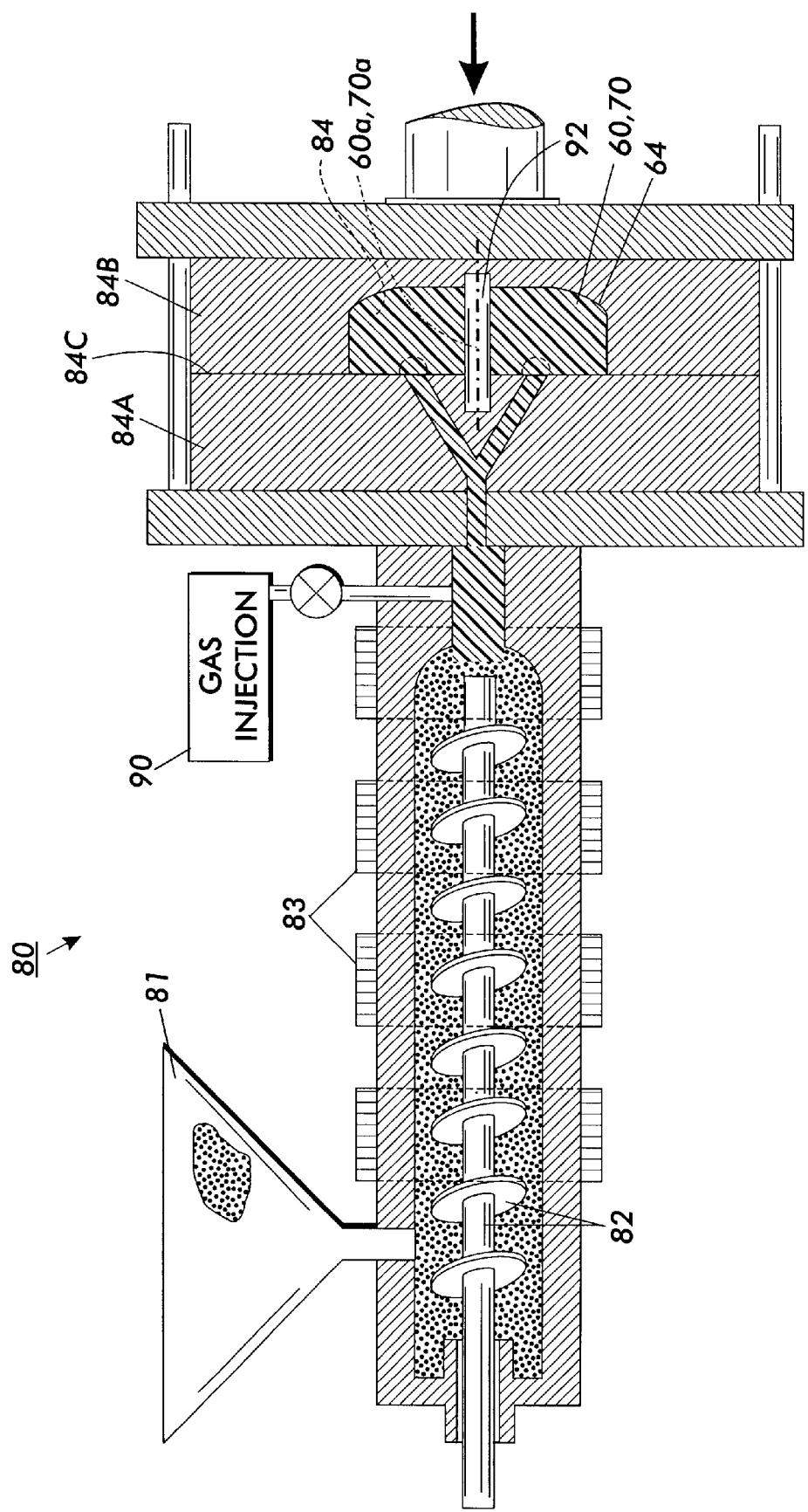

FIG. 5, labeled "Prior Art", is similar to the views of FIG. 6 but shows two gear teeth of a mating gear set which do not have any gear crowning and have non-parallel, miss-aligned, respective gear axes as respectively shown in dashed lines and even more clearly shown by the two additional respective dashed lines perpendicular to the gear axes (in the respective normal or face plane of the two gears), which latter dashed lines are shown at an angle to one another;

FIG. 6 is similar to FIG. 4, illustrating the half crowned mating gears with opposite side crowning, compensating for gear axes misalignment as shown in FIG. 5; and FIG. 7 schematically illustrates one example of a plastic molding system which can be used to manufacture all of the half-crowned gears of FIGS. 2, 3, 4 and 6.

Figure 1:
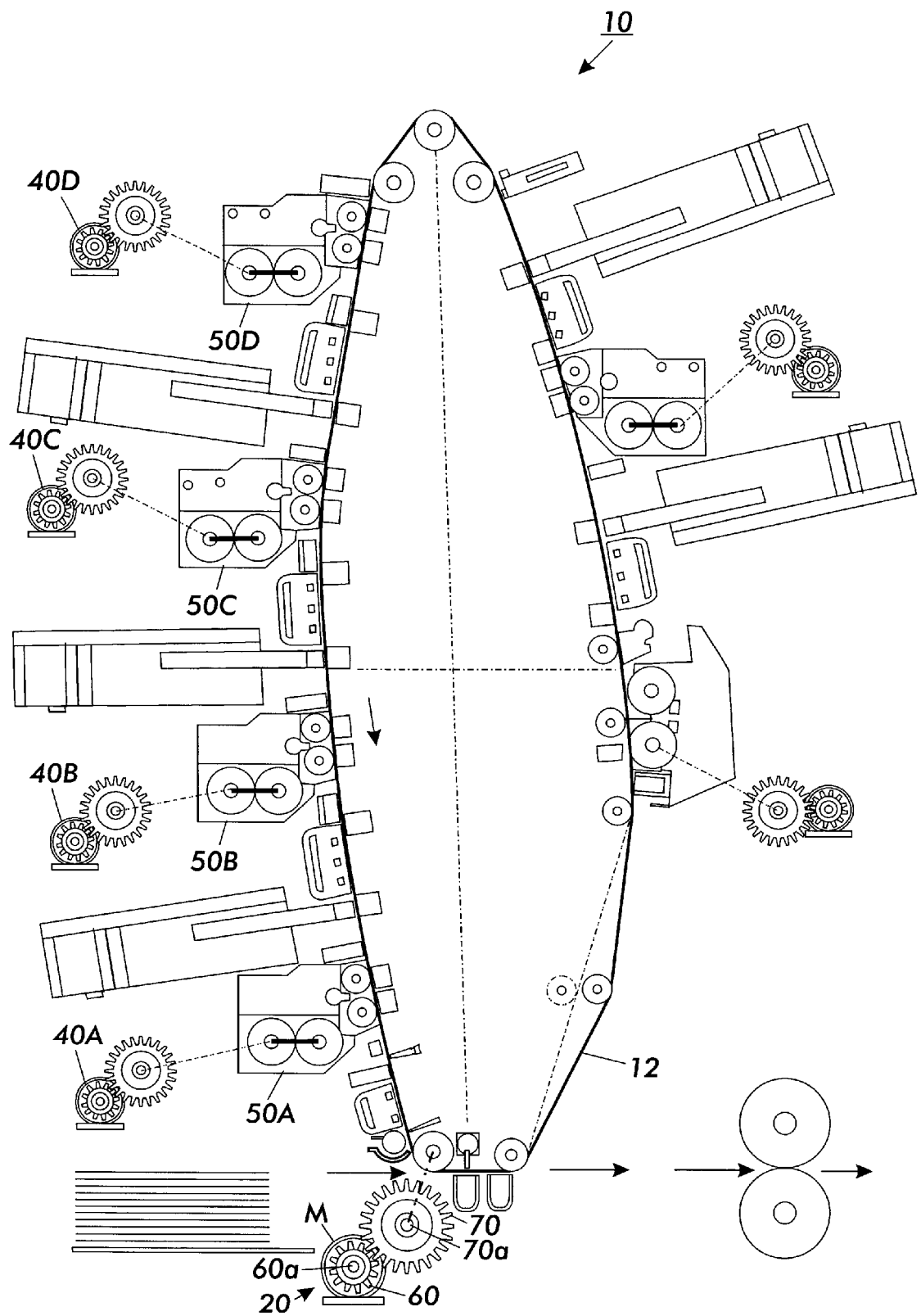
FIG. 1 is a frontal view of an exemplary known patent drawing of an exemplary color printer, on which there is schematically illustrated some examples of applications of the subject improved drive system for improved motion control in printers, especially for the imaging surface, which in this case is the photoreceptor.
Figure 2:
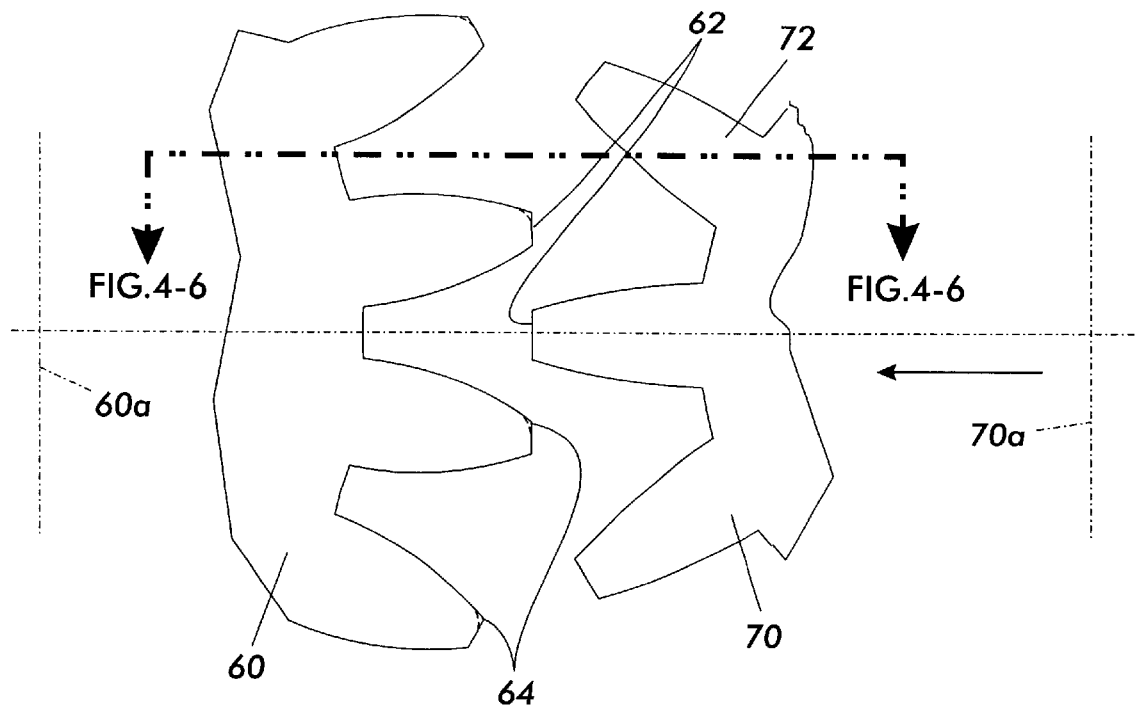
FIG. 2 is an enlarged partial view of two normally meshed gears of an exemplary drive system of FIG. 1, but illustrated with the gears separated from one another instead of meshed, and showing by the arrow-headed dashed line labeled "4–6" the view direction and position for FIGS. 4 and 6 (which are enlarged top views of opposing gear teeth)

Describing now in further detail the exemplary embodiments with reference to the Figures, there is shown in FIG. 1 an exemplary printer (reproduction machine) 10, by way of showing examples of applications of the subject improved drive system for improved motion control of motion critical components, in particular, a photoreceptor 12. In this example, a simplified drive system 20 for the photoreceptor 12 is shown, with a pinion gear 60 (driven by a drive motor "M") and its mating driven gear 70, with substantially parallel respective axes of rotation 60a and 70a. The pinion gear 60 has half-crowned 64 teeth 62 edges (as will be further described herein with reference to other, enlarged, views of FIGS. 3, 4 and 6). This drive system 20 provides improved motion control driving of the photoreceptor 12 imaging surface even with substantial variations in displacement from the parallel (misalignment) of gear axis 60a relative to gear axis 70a, as illustrated in FIG. 6. (Such mating gear axis alignment variations are inherent in manufacturing and installation tolerances, especially for lower cost systems.)

Merely as examples, other such exemplary drives 40A, 40B, 40C, and 40D are schematically shown driving the image developer units 50A, 50B, 50C, 50D of this exemplary printer 10 in this example of FIG. 1. Various other motion uniformity critical components of the printer 10 may be driven in this same general manner, such as various paper path drives.

FIGS. 3, 4 and 6 show enlarged details of this exemplary motion smoothing drive system 20 with a gear set of two oppositely half-crowned mating gears 60 and 70, with respective axes of rotation 60a and 70a. In FIG. 3 there is shown one gear tooth 62 of the gear 60, with edge crowning 64 by an amount 66 (exaggerated for visibility) extending from the center of the tooth along only one side thereof to one outer edge or corner of the gear tooth 60. It may be seen from FIGS. 4 and 6 that the mating gear 70 gear tooth 72 is similarly half-crowned 74, but on the opposite side of the tooth 72 from the mating tooth 62 of gear 60. As will be further described below, FIG. 4 illustrates the situation in which the opposing half-crowned gear teeth of this drive system have the mating gear axes 60a and 70a aligned, whereas FIG. 6 illustrates the situation of a misalignment of the axes 60a and 70a.

The gear tooth crowning, by removing what would otherwise be gear tooth material from the edges of the gear teeth, causes the misaligned gear teeth to contact more towards the center of the face width of the gear teeth even though they have a skewed engagement, as in FIG. 6. To express it another way, this longitudinal crowning across the face of the tooth forms a tooth which is slightly thinner at one end of the tooth than in the middle of the tooth, thereby moving the load transmission to the middle of the gear teeth and avoiding end loading problems when the gear shafts are misaligned. The crowning is not done in the center of the gear tooth. The crowning can be any suitable arcuate tapering shape increasing towards the tooth side edge, such as straight, parabolic or circular crowning. However, the preferred crowning configuration is circular edge crowning, a term understood by those skilled in this art. Helical gears will, of course, require a corresponding difference in crowning.

In contrast, with prior art un-crowned (flat) gear teeth, as in FIG. 5, the mating gear teeth will engage across their entire width only with true or near perfect gear alignments, and otherwise the contact pattern is primarily at the edges of the teeth.

With a unidirectional drive system 20 only a lead crown is needed. That is, only the driving side of the gear teeth need be crowned. For bi-directional drives the other engagement side of each tooth can be edge crowned in the same manner, if desired, assuming that motion control is critical in the reverse driving direction.

As noted above, the disclosed half-crowned gears, or the like, are particularly desirable for low cost plastic molding in a simple mold, such as illustrated in FIG. 7, which can also avoid parting line flashing along the tooth center. In the illustrated half-tooth-width crowning, there is crowning on only one side of each gear. The half crowning can thus be at the inside of a simple mold to provide mold withdrawal clearance. However both opposing (meshed) gears may be formed in the same mold but then reverse mounted relative to one another to provide a gear set which will have the crowned side of one gear opposing the uncrowned side of the other gear, as shown in FIGS. 4 and 6. That is, both of the first and second mating gears 60, 70 are identically molded in the same mold but then assembled inverted relative to one another in the gear drive system 20 to provide oppositely positioned outer edge crowning. The gears made in this manner may, of course, be marked to show their desired inboard and outboard sides, so that in assembly they will be properly mounted with opposing rather than mating crowned sides.

Of course, where the gears 60, 70 are of different diameters, to provide gear reduction, as shown in FIG. 1, then two different molds will be required for the two different gears. However, the same simple mold and molding process and reverse mounting process may be used.

Turning now to FIG. 7, this schematically illustrates merely one example of a simple two part mold plastic molding system 80 which can be used to manufacture all of the half-crowned gears 60,70. Suitable plastic material is conventionally fed from a hopper 81 by an auger pressure injector 82 with heaters 83 into the mold chamber or cavity 84 defined by the fixed part 84A and the movable part 84B with a parting line 84C which is at or outside of one edge of the molded gear 60,70 so that any flashing may be easily removed simply by flat grinding off a thin layer of that one side of the molded gear. Note that the half-crowning 64 of the gear teeth is on the inside of the mold cavity 84, improving the draw of the finished part out of the mold, and not requiring any negative clearances which would require a more complex mold.

An optional feature schematically illustrated in FIG. 7 is gas bubble injection 90 under pressure, as described in the above-cited patents and application thereon. As described there, that helps to resist shrinkage of the plastic material as it cools in the mold, to improve the conformance of the finished gear to the mold surfaces. As is also known in the art, optionally a steel gear shaft 92 my be inserted into the mold in advance and molded into (onto) the plastic gear being molded, thus accurately defining the gear axes 60a, 70a of the finished gear as it is removed from the mold, fully formed.

The two mating half-crowned gears 60, 70 in this combination emulate and provide the contact pattern and drive performance of a full circular crowned gear, forcing the engaged tooth contact well within the face width dimension of both gears even with gear shaft misalignment.

Initial testing of a disclosed embodiment has demonstrated that 75 to 100 microns of gear tooth outer edge (corner) crowning can yield up to a 15× (fifteen times) improvement in allowable motion transmission errors for a printer drive system for a "worse case" situation of mating gear axes misalignment within easily achievable manufacturing and assembly tolerance specifications.

Lead edge crowning on the order of 75 microns has been found to improve the gear alignment latitude by 10× (±0.001 mm/mm total tolerance of allowable gear skew has been relaxed to ±0.005 mm/mm). This tolerance is defined as the in plane displacement deviation of one edge of the tooth divided by the total face width of the gear. As predicted in gear models and demonstrated in hardware, the motion quality performance of the gears remains unchanged in this range, exhibiting 0.02% to 0.04% dV/V performance in lieu of a 0.25% performance goal, where dV is the measured velocity error on the photoconductor and V is the nominal process velocity. For critical motion quality applications such as a photoconductor drum or belt, typical performance goals for this ratio are ≦0.25%dV/V.

While the embodiments disclosed herein are preferred, it will be appreciated from this teaching that various alternatives, modifications, variations or improvements therein may be made by those skilled in the art, which are intended to be encompassed by the following claims.

What is claimed is:

1. A method of manufacturing an improved gear drive system to provide improved drive motion uniformity with reduced manufacturing costs, said method producing a gear drive system comprising at least one pair of rotatable first and second engaged gears with respectively engaged gear teeth areas and respective first and second gear axes, said gear drive system having a drive motion tolerance to slight alignment variations of said first and second gear axes relative to one another; comprising:

molding said first and second drive gears with gear teeth having outer edge crowning on only one side of said gear teeth in a mold in which the parting line of said mold is outside of said respectively engaged gear teeth areas, said gear tooth outer edge crowning being sufficient to substantially increase said drive motion uniformity of said drive system with said alignment variations of said first and second axes of gear rotation; and assembling said first and second gears engaged into said gear drive system so that said outer edge crowning on only one side of said gear teeth of said engaged first and second gears are respectively opposite in position to one another to provide said tolerance in motion control to slight alignment variations of said first and second gear axes relative to one another.

2. The method of manufacturing an improved gear drive system of claim 1, wherein said first and second gears are oppositely half-crowned plastic molded gears.

3. The method of manufacturing an improved gear drive system of claim 1, wherein said gear tooth outer edge crowning of said engaged gear teeth of said first and second gears is an equal but opposite lead circular half-crowning.

4. The method of manufacturing an improved gear drive system of claim 1, wherein said first and second gears are molded in a mold cavitiy in the same orientation, with said outer edge crowning on only one side of said gear teeth inside of said mold cavitity, but wherein said molded first and second gears are assembled inverted relative to one another in said gear drive system to provide said oppositely positioned outer edge crowning.

5. The method of manufacturing an improved gear drive system of claim 1, wherein said gear teeth have outer edges which are substantially linear other than at said crowned outer edge thereof.

6. The method of manufacturing an improved gear drive system of claim 1, wherein said gear teeth are half-crowned with a crowning in the range of approximately 75–100 microns.

7. The method of manufacturing an improved gear drive system of claim 1, wherein said first and second gears are identically molded in the same mold but assembled inverted relative to one another in said gear drive system to provide said oppositely positioned outer edge crowning, wherein said gear tooth outer edge crowning of said engaged gear teeth of said first and second gears is an equal but opposite lead circular half-crowning, and wherein said gear teeth half-crowning is in the range of approximately 75–100 microns.

\* \* \* \* \*